June 21, 1966   W. BORBERG ETAL   3,257,507
ADJUSTABLE VIEWING HOOD
Filed Nov. 26, 1963   2 Sheets-Sheet 1
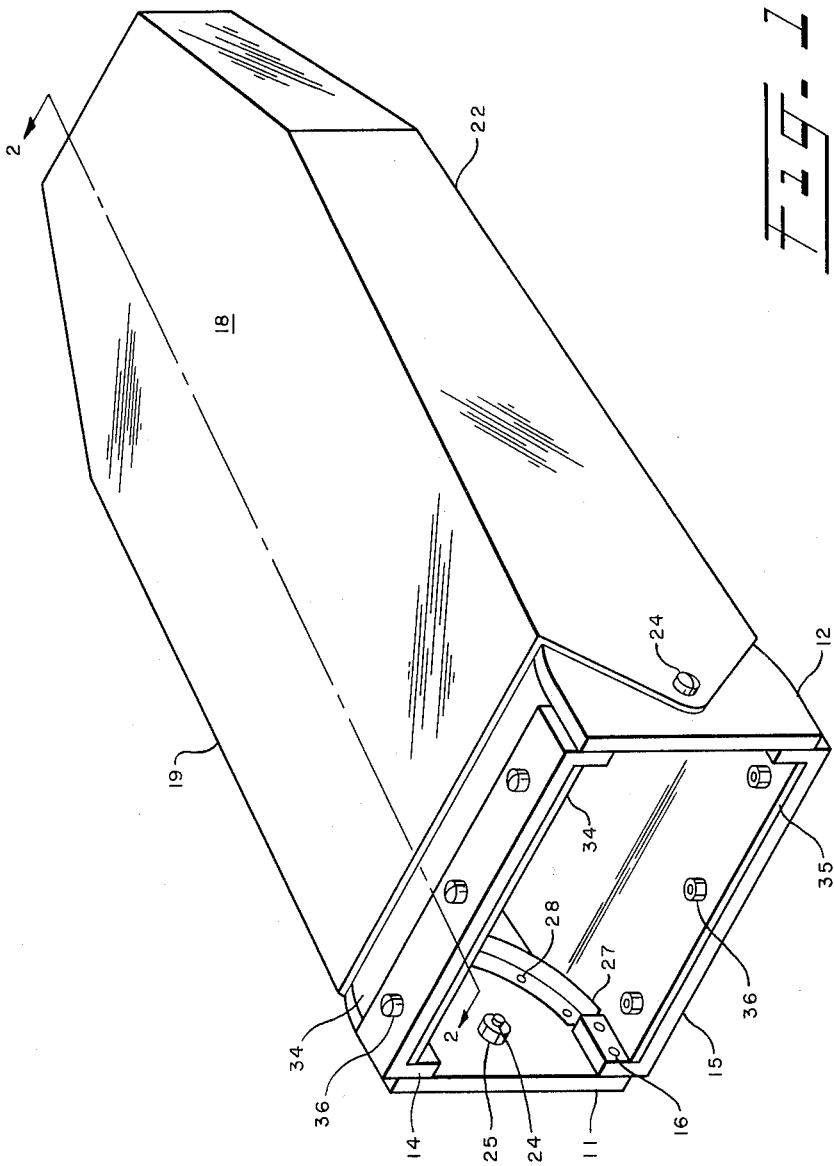
INVENTOR.
WILLY BORBERG
LEIF PEDERSEN
BY
ATTORNEY.

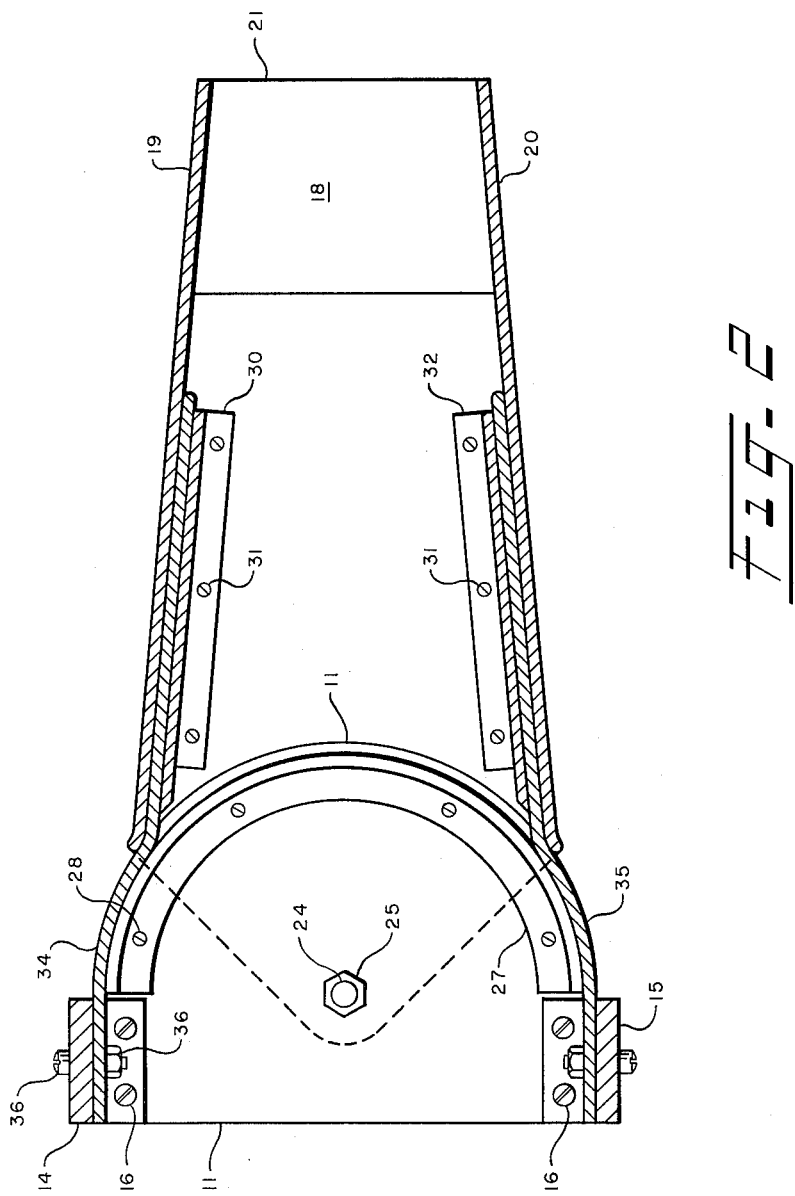

United States Patent Office 3,257,507
Patented June 21, 1966

3,257,507
ADJUSTABLE VIEWING HOOD
Willy Borberg, Briarcliff Manor, and Leif Pedersen, South Salem, N.Y., assignors to General Precision, Inc., a corporation of Delaware
Filed Nov. 26, 1963, Ser. No. 325,976
3 Claims. (Cl. 178—7.82)

This invention relates to light excluding adjustable viewing hoods for use with oscilloscopes, kinescopes, radarscopes and other similar devices.

It is often either necessary or desirable to view radarscopes, television receivers, viewfinders, cameras and other similar devices under conditions of high ambient light intensities. Under these conditions the image displayed is not readily visible due to loss of contrast.

Viewing hoods are generally provided to overcome the loss in contrast by excluding the ambient light. However, these hoods restrict the positions from which the image may be viewed and are therefore made adjustable in at least one plane to permit more freedom in use.

In order to achieve adjustability while maintaining the required light excluding feature a flexible light tight member must be inserted in the viewing hood. This member, in most prior art devices, is in the form of a bellows and includes means for locking the hood in a desired position once it is adjusted. Arrangements of this type are costly to manufacture and subject to early failure because of the constant flexing in the bellows.

One object of this invention is to provide a light excluding adjustable viewing hood for use with oscilloscopes, kinescopes, radarscopes and similar devices which may be adjusted over a wide angle.

Another object is to provide a hood as set forth above which is inexpensively and easily manufactured.

A further object is to provide a light tight hood as set forth above which is reliable in operation and durable.

The invention contemplates a light excluding adjustable viewing hood comprising, an open-ended fixed viewing duct, a second open-ended viewing duct pivotally mounted on the side walls of the fixed duct and free to move in one plane, and a pair of flexible sheet members attached to the fixed duct and slideably guided within the movable duct to provide a light excluding seal between the fixed and moveable ducts.

The foregoing and other objects and advantages of the invention will become more apparent from a consideration of the drawings and specifications wherein one embodiment of the invention is shown and described for illustration purposes only.

In the drawings:

FIGURE 1 is an isometric view of a novel adjustable viewing hood constructed according to the invention; and, FIGURE 2 is a cross-sectional view taken along the line 2—2 of FIGURE 1.

In FIGURE 1 a pair of spaced side walls 11 and 12 are joined together to form a fixed duct by a top wall 14 and a bottom wall 15. The top and bottom walls are fastened to the side walls by a plurality of screws 16.

An adjustable duct 18 having top and bottom walls 19 and 20, respectively, joined by spaced side walls 21 and 22 is pivotally mounted on side walls 11 and 12 by two identical screws 24. Screws 24 are secured by nuts 25 only one of which is visible in the drawings.

The forward edges of walls 11 and 12, as seen in FIGURE 1, are rectilinear while the rearward edges, as seen best in FIGURE 2, are arcuate. Screws 24 pass through the walls 11 and 12 at the generating center of the arc, thus, the forward edges of walls 19 and 20 follow in close proximity the arcuate edges of walls 11 and 12 throughout the entire range of adjustment.

The rectilinear edges of walls 11 and 12 and the forward edges of walls 14 and 15 will during use be brought into light sealing engagement with the scope being used. Here any number of conventional attaching devices may be employed and since no provision for adjustment is necessary they may be directly attached to the fixed duct formed by walls 11, 12, 14 and 15.

An arcuate flange member 27 is attached to each of the side walls 11 and 12 by a plurality of fasteners 28. The flange may alternately be integrally formed from each of the side plates. In addition the diameter of the arcuate portion of flange 27 is slightly smaller than the diameter of the side walls 11 and 12. This is best seen in FIGURE 2. However, this arrangement while it provides somewhat better light sealing is not essential since an adequate degree of light sealing may be achieved with identical diameters for both the arcuate portions of walls 11 and 12 and the flanges 27.

A U-shaped guide 30 is attached to side walls 21 and 22 by screws 31 in close proximity to top wall 19. The spacing is such that a thin sheet member may freely move back and forth in the viewing direction. A similar U-shaped member 32 is attached in the same manner in close proximity to bottom wall 20.

Two thin sheets 34 and 35 of opaque flexible material are attached to top and bottom walls 14 and 15, respectively, by mechanical fastener 36 which may take any of numerous well-known forms. The sheets 34 and 35 are inserted into guides 30 and 32, respectively, and each is forced into engagement with the flanges 27 by the forward edges of the top and bottom walls, respectively, of moveable duct 18.

Sheets 34 and 35 may be fabricated from a wide variety of flexible materials such as steel, tetrafluroethylene, Phosphor bronze and many other materials which exhibit similar characteristics.

While one embodiment of the invention has been illustrated and described in detail, it is to be expressly understood that the invention is not to be limited thereto. Various changes may also be made in the design and arrangement of the parts without departing from the spirit and scope of the invention as the same will now be understood by those skilled in the art.

What is claimed is:

1. A light excluding adjustable viewing hood comprising,
   an open-ended fixed viewing duct adapted to have one of its open ends placed in light excluding engagement with a scope, said fixed duct including two spaced side walls connected by top and bottom walls,
   an open-ended moveable viewing duct having two spaced side walls connected by top and bottom walls, said side walls extending in one direction beyond the top and bottom walls and pivotally engaging the side walls of the fixed viewing duct whereby said moveable viewing duct is free to move a predetermined angular distance with respect to said open ended fixed viewing duct in one direction,
   first and second flexible sheet members attached to said top and bottom walls respectively of said fixed duct, said sheets extending outwardly therefrom and laterally between said side walls into the interior of said moveable duct, and
   first and second guide means positioned adjacent to the inwardly facing surfaces of the top and bottom walls of the moveable duct respectively, for slideably engaging the first and second flexible sheet members, respectively, whereby said first and second flexible sheet members are free to move with respect to the moveable duct in close proximity to the said top and bottom walls of the said moveable duct and are thereby maintained in light sealing engagement with the side walls of the fixed duct.

2. A light excluding adjustable viewing hood comprising, an open-ended fixed viewing duct having a pair of spaced side walls connected by top and bottom walls to form a duct of rectangular cross-section, said side walls each having rectilinear top, bottom, and forward edges and arcuate rear edges, an open-ended moveable viewing duct having two spaced side walls connected by top and bottom walls, said side walls connected by top and bottom walls, said side walls extending in one direction beyond the top and bottom walls and pivotally engaging the side walls of the fixed viewing duct whereby said moveable viewing duct is free to move a predetermined angular distance with respect to the fixed duct and the forward edges of the top and bottom walls of the moveable duct remain at a predetermined distance from the arcuate edges of the side walls of the fixed duct throughout the entire range of adjustment, first and second flexible sheet members attached to the said top and bottom walls, respectively of the fixed duct, said sheets extending outwardly therefrom and laterally between said side walls into the interior of the moveable duct, and first and second guide means positioned adjacent to the inwardly facing surfaces of the top and bottom walls of the moveable duct, respectively, for slideably engaging the first and second sheet members, respectively, to provide free movement of the first and second flexible sheet members with respect to the top and bottom walls, respectively.

3. A light excluding adjustable viewing hood as set forth in claim 2 in which said side walls of the fixed duct each include an arcuate flange projecting inwardly therefrom, each said flange being spaced from its associated arcuate wall edge a distance substantially equal to the thickness of the sheet member which is supported thereon whereby the forward edges of the top and bottom walls of the moveable duct engage the first and second sheet members respectively and urge them into light sealing contact with the flanges.

No references cited.

DAVID G. REDINBAUGH, *Primary Examiner.*

R. L. RICHARDSON, *Assistant Examiner.*